Patented May 17, 1949

2,470,411

UNITED STATES PATENT OFFICE 2,470,411

PROCESS OF PREPARING A SILICA-MAGNESIA GEL CATALYST

Eugene S. Corner, Roselle, N. J., assignor to Standard Oil Development Company, a corporation of Delaware No Drawing. Application August 21, 1946, Serial No. 692,123

4 Claims. (Cl. 252—457)

The present invention is concerned with a process for the preparation of improved catalysts. It more specifically relates to the preparation of improved catalysts suitable for use in cracking, reforming, isomerization, polymerization, and alkylation processes. In accordance with my process, an improved magnesia silica catalyst is prepared by aging the hydrogel at room temperatures for a time period determined by the concentration of the aqueous slurry of the hydrogel.

It is known in the art to improve the quality of oils, particularly petroleum oils, by treating the same with catalysts under various operating conditions. For example, it is well known to treat petroleum oils boiling in the range above about 400° F. with a silica magnesia catalyst at temperatures in the range from about 600° F. to about 1100° F. in order to crack the oils and to secure petroleum oil fractions boiling in the motor fuel boiling range. It is also known in the art that synthetic porous solids, comprising silica and one or more metallic oxides, such as alumina, magnesia, zirconia, beryllium, etc., have catalytic properties for the treatment of mineral oils.

In the cracking of these mineral oils the properties of the catalyst will depend on the metallic oxide or oxides incorporated with the silica, the method of treatment during incorporation and the quantity or quantities incorporated. For instance, one general classification of synthetic contact masses consists of silica and alumina, with or without the addition of a third component such as zirconium or the like. Catalysts of this general class are characterized as those producing relatively large amounts of olefinic and isoparaffinic hydrocarbons having molecular weights from about 28 to about 56 or higher, and capable of producing naphthas in the gasoline boiling range which contain appreciable quantities of mono and poly-cyclic aromatic hydrocarbons. In general, this class of catalysts is highly desirable for the manufacture of aviation gasolines.

Another general classification of synthetic contact masses comprises silica and magnesia as the major oxides with or without the addition of alumina, calcium or the like. In comparison with the above discussed classification, the silica-magnesia type catalysts, during cracking, produce smaller quantities of hydrocarbons having molecular weights below about 58 and produce a substantial increase of hydrocarbons having desirable antiknock qualities, boiling in the range from about 100° F. to about 450° F. vapor temperature. It is apparent that these catalysts are more suited for refining operations, designed to produce high quality motor gasolines, provided these catalysts can be prepared to possess desirable activity and stability characteristics. My invention is concerned with a process for producing superior characteristics in a commercially desirable manner by aging the catalysts for a time period which is the function of the concentration of the catalysts in the water slurry.

Heretofore, these catalysts have been prepared by various procedures. One method employed in the manufacture of these catalysts is to prepare a silica hydrogel by mixing an alkali metal silicate and an acid, such as sulfuric acid. The hydrogel is washed and soaked in a solution containing a salt of, magnesium, manganese, beryllium, zirconium, or a salt of any other desirable metal with which it is to impregnate the silica hydrogel. The concentration of the solution with respect to the salts is adjusted to give the composition desired in the final catalysts. After the impregnation step, the hydrogel is generally treated with a solution of ammonia in order to precipitate the magnesia and the oxide of the added metal within the gel structure. The hydrogel is washed free of soluble salts, dried and activated.

Another method utilized for the preparation of these catalysts is to prepare a silica hydrogel by mixing sodium silicate and sulfuric acid. The silica hydrogel is washed and dried. The dried gel is then mixed by grinding with magnesia and the oxide of a third metal, if it is desired to impregnate the hydrogel with the third component. The catalyst is dried at a temperature in the range from about 200° F. to 300° F. and activated.

Another method of preparing silica magnesia catalysts is to mull magnesia with the silica hydrogel in water. The ratio of water to the total solids is usually in the range from about 5 to about 12 parts by weight of water per part by weight of solids. The mulling is usually carried out by suitable means such as in a bowl, tube, rod mill, pan mill or the like. Mulling is conducted over a period of about 5 to about 10 hours under conditions to form a very finely divided product which, in many cases, is a semifluid. The material is slowly dried in a convex type drier operating at a temperature in the range from about 180° F. to about 275° F. The drying period is from about 12 to about 48 hours.

The dried catalyst is activated by heating at a temperature in the range from about 1150 to 1400° F., generally at a temperature of about 1250° F. for a period of about three hours.

From the preceding discussions it is apparent that the general procedure for the preparation of these catalysts is to prepare the silica hydrosol by the addition of sodium silicate to sulfuric acid. The resulting silica hydrosol, hydrogel, or gelatinous precipitate is then mixed by various means with magnesia to secure the desired silica-magnesia composition. If it is desired to prepare a three-component catalyst comprising for example, oxides of the metals of group II, III, IV, VI and VIII of the periodic table, these oxides may be mixed with the silica sol or the silica hydrogel. Suitable metals of this classification are, for example, manganese, zirconium, beryllium, zinc, titanium, aluminum, cadmium, chromium, copper and iron.

In the usual procedure it has heretofore been the practice to dry the hydrogel at a temperature in the range from about 200° F. to 350° F. and then to activate the dried catalyst at a temperature in the range from about 1100° F. to 1450° F., generally at a temperature of about 1250° F. for a period of from about 2 to 6 hours.

I have now, however, discovered that providing an aging period be employed prior to drying the catalyst unexpected, desirable results are secured with respect to the initial activity of the catalyst. Also by employing my procedure the catalysts will possess improved steam stabilities. By steam stability is meant the ability of catalyst to retain its catalytic activity after it has been exposed to the effect of steam. It is very important that catalysts possess good steam stabilities, i. e., that they resist the action of steam, since steam is present in both the reactor and regenerator. The steam is generally employed to purge the catalyst before it is introduced into these vessels. Steam is particularly detrimental to catalyst of the present invention at regeneration temperatures in that it appreciably lowers the catalytic activity. Thus, it is obvious that my process which produces catalysts of improved steam stabilities is highly desirable. In accordance with my invention I propose to age the aqueous slurry of catalysts of the present invention for a period of from about 8 to 150 hours, at a temperature in the range from about 60° F. to 90° F. The period of time over which I age the catalyst of the present invention is a function of the concentration of the catalyst in the aqueous slurry.

The process of my invention may be more readily understood by reference to the following examples illustrating the same.

EXAMPLE I

A sodium silicate solution ($Na_2O.3.25SiO_2$) solution having a specific gravity of 1.21 was mixed with a sulfuric acid solution having a specific gravity of 1.19. Approximately 806 parts by weight of the sodium silicate solution was mixed with 396 parts by weight of the sulfuric acid solution. The resulting washed silica hydrogel had a $SiO_2$ concentration of 13.01%. The silica hydrogel was mixed with magnesium oxide in proportions to give 65% $SiO_2$ and 35% MgO on a dry basis. The magnesium oxide contained 94.9% magnesium oxide by weight. The mixture of silica hydrogel and magnesium oxide was ball milled for six hours at a temperature of about 75° F. together with 1300 parts of distilled water.

The mixture was aged by allowing it to stand at room temperature (68° to 75° F.) without drying for 36 hours. The catalyst was then dried at a temperature of about 350° F. The catalyst was pelleted and activated by treating it at a temperature of 1250° F. for a period of 3 hours.

A catalyst was prepared in a similar manner to that described above except that it was dried immediately after mixing, without any intermediate aging period.

These catalysts were used to crack an East Texas gas oil which boiled above about 400° F. at a temperature of 850° F. The feed rate employed was 0.6 volume of feed gas oil per volume of catalyst per hour. The results secured are tabulated as follows:

[East Texas gas oil cracked at 850° F. Feed rate 0.6 vol. of feed per vol. of catalyst per hour.]

|  | Operation I | Operation II |
|---|---|---|
| Catalyst Aged (68° to 75° F.)...hours.. | 36 | 0 |
| Catalyst Dried...°F.. | 350 | 350 |
| D+L[1]...percent.. | 56 | 43 |

[1] Liquid product comprising hydrocarbons of 4 or more carbon atoms and up to 400° F. end point.

From the above data it is apparent that my catalyst aged for 36 hours was appreciably more effective in the cracking of this gas oil.

EXAMPLE II

A catalyst was prepared as described in Example I except that it was dried at 220° F. Another catalyst was prepared and dried at 220° F. except that it was not aged in accordance with my process.

These catalysts were used to crack an East Texas gas oil at 850° F. A feed rate of 0.6 volume of gas oil per volume of catalyst per hour was employed. The results secured on the respective operations are tabulated as follows:

[East Texas gas oil cracked at 850° F. Feed rate 0.6 vol. of feed per vol. of catalyst per hour.]

|  | Operation III | Operation IV |
|---|---|---|
| Catalyst Aged (68° to 75° F.)...hours.. | 36 | 0 |
| Catalyst Dried...°F.. | 220 | 220 |
| D+L...per cent.. | 54 | 46 |

EXAMPLE III

Various procedures were employed for the preparation of catalysts, which catalysts were subsequently employed in cracking operations. The results are tabulated in the table.

Catalysts 1 to 4, containing 20% of solids in the slurry, were mulled for a period of one hour and aged for various time periods. Catalysts 5 to 7, containing 15% of solids in the slurry, were mulled for three hours and aged for various time periods. Catalysts 8 to 10, containing 12½% solids in the slurry, were mulled for 3½ hours and aged for various time periods.

These catalysts were used to crack an East Texas gas oil which boiled above about 400° F. at a temperature of 1250° F. and at 0.6 volume of feed per volume of catalyst per hour. The initial effectiveness of the respective catalysts is readily apparent from the data.

The catalysts were then steamed for 24 hours at 60 lbs. per sq. in. at a temperature of 1060° F. These steamed catalysts were used to crack East Texas gas oils under similar conditions. The effectiveness of the steamed catalysts is also readily apparent from the data.

Effect of aging on initial activity and steam stability of silica-magnesia (65% $SiO_2$—35% MgO) catalysts

| Catalyst | Percent Solids in Slurry | Total Mulling Period, Hrs. | (68° to 75° F.) Aging Period After Mulling, Hrs. | Activity [1] Initial | Activity [1] After Steaming [2] |
|---|---|---|---|---|---|
| 1 | 20 | 1 | 0 | 47 | 21 |
| 2 | 20 | 1 | 24 | 55 | 21 |
| 3 | 20 | 1 | 48 | 50 | 25 |
| 4 | 20 | 1 | 168 | 47 | 35 |
| 5 | 15 | 3 | 0 | 45 | 20 |
| 6 | 15 | 3 | 8 | 52 | 37 |
| 7 | 15 | 3 | 48 | 48 | 30 |
| 8 | 12.5 | 3.5 | 0 | 51 | 18 |
| 9 | 12.5 | 3.5 | 24 | 49 | 27 |
| 10 | 12.5 | 3.5 | 48 | 50 | 28 |

[1] Percent of recovered liquid product boiling in the butane to 400° F. gasoline range. Testing conditions were: cracking temperature 850° F., feed rate 0.6 V./V./hr.
[2] Steamed 24 hours at 1050° F. and at 60 p. s. i. g.

My invention comprises in general the preparation of improved active catalysts of the type described, by aging the catalysts for a time period before drying and activating. My invention may be varied within the scope outlined. However, in general, I prefer to age the catalysts at temperatures in the range from about 60–90° F., preferably at a temperature of in the range from about 70–75° F., for a time period of from about 8 to 150 hours. In accordance with the preferred modification of my invention, if the aqueous slurry contains from about 10 to 17% solids in the slurry, I prefer to age my catalysts at a temperature of about 70–75° F. for a time period of about 8 to 30 hours. However, if the concentration of the solids in the slurry exceeds about 17%, the catalysts should be aged for a period not less than 48 hours, and preferably should be aged at a temperature of from 70–75° F., for a period of about 50 to 150 hours.

The process of my invention is not to be limited by any theory as to mode of operation, but only in and by the following claims.

I claim:

1. A process for preparing a catalyst comprising silica and magnesia, adapted for the conversion of hydrocarbon oils and having improved steam stability, which comprises preparing a hydrous oxide of silica selected from the class consisting of silica hydrogel and gelatinous precipitated silica, intermixing said hydrous oxide with magnesia and water to form a slurry containing not less than about 10% of solids, mulling said slurry for a substantial period sufficient to form an intimate homogeneous mixture of said silica and said magnesia, thereafter aging the mulled slurry at a temperature between about 60° F. and 90° F. for a period of about 8 to 150 hours and thereafter drying and activating the resulting product.

2. The process defined by claim 1 wherein the hydrous oxide of silica is silica hydrogel.

3. The process defined by claim 1 wherein the slurry contains from 10% to 17% solids and the aging period is from about 8 to about 30 hours.

4. The process defined by claim 1 wherein the slurry contains from 17% to 20% solids and the aging period is from about 50 to about 150 hours.

EUGENE S. CORNER.

REFERENCES CITED

The following references are of record in the file of this patent:

UNITED STATES PATENTS

| Number | Name | Date |
|---|---|---|
| 1,900,859 | Connolly et al. | Mar. 7, 1933 |
| 2,340,934 | Connolly | Feb. 8, 1944 |
| 2,343,295 | Bailie et al. | Mar. 7, 1944 |
| 2,343,731 | Bailie et al. | Mar. 7, 1944 |
| 2,390,556 | Ruthruff | Dec. 11, 1945 |
| 2,412,958 | Bates et al. | Dec. 24, 1946 |